United States Patent Office 2,819,491
Patented Jan. 14, 1958

2,819,491

METHOD OF PREPARING MOLDED DEHYDRATING AGENTS

Adrian M. Gammill, Glen Burnie, and Ellsworth G. Acker, Baltimore, Md., assignors to W. R. Grace & Co., New York, N. Y., a corporation of Connecticut No Drawing. Application March 31, 1955
Serial No. 498,432

9 Claims. (Cl. 18—47.5)

This invention relates to dehydrating agents and to a method of making the same. In one particular aspect it relates to a molded silica gel dehydrating agent suitable for use in removing moisture from refrigerants and the like.

In a refrigeration system, the refrigerant is compressed while in a gaseous state and moved to a condenser where it is liquified. The heat of condensation is generally removed by the atmosphere or cooling water. The liquid then passes through an expansion valve into the space to be refrigerated where it absorbs heat by evaporation. The refrigerant is returned to the compressor as a vapor and the cycle is repeated by an automatic device which causes the compressor to come into operation when the liquified refrigerant is reduced to a certain level.

Successful operation of the refrigerating apparatus demands the use of a refrigerant which is chemically stable, noncorrosive, and has a low water content. The water content must be sufficiently low so that ice formation will not occur during the evaporation cycle and thus cause a freeze-up in the line. The residual water content of commercial refrigerants, of which dichlorodifluoromethane is typical, is well below the freeze-up level normally encountered in a refrigeration system, it being no greater than 10 p. p. m. (3 to 5 p. p. m. is usual). This level corresponds to the saturation solubility of water in the refrigerant at 5° F., below which the water and the refrigerant will begin to separate into two phases and ice will tend to form. The temperature at which ice will form increases as the water content of the refrigerant increases.

Water may be introduced into a refrigeration system by incomplete drying of the unit before charging with the refrigerant, by leakage of water into the system during charging, such as by improper servicing, by leakage around improperly seated valves and connections, or by decomposition of certain organic matter in the material, such as winding covers, insulation, etc. In addition to causing possible freeze-up through ice formation, corrosion is more pronounced with a high water-content refrigerant.

To maintain the water in a refrigeration system at a low level, it is the practice to place a suitable desiccant in the liquid line. Typical desiccants are silica gel, calcium sulfate, activated carbon, calcium chloride, and activated alumina. These and other desiccants may be employed in powdered form, as granules or molded into particular shapes. The desiccant is placed in a dehydrating unit which is generally disposed in the system to dehydrate the refrigerant when it is in the liquid phase. Because of the constant flow of refrigerant through the desiccant, the powdered desiccants have the disadvantage in that minute particles tend to enter the stream and seriously impair its efficiency. On the other hand, the granular material tends to distintegrate and eventually the smaller particles leave the dehydrating unit and become entrained in the refrigerant. Molded desiccants have gained commercial favor because in addition to their dehydrating capacities the desiccants act as filtering media for impurities.

The preparation of molded desiccants for dehydration purposes presents certain problems. Not all desiccants nor are all binders suitable for molding purposes. Certain molded desiccants tend to develop cleavage planes after they have been in use in the system for a period of time and eventually the desiccant will be divided along these planes. This is unsatisfactory as the refrigerant will channel through these divisions and thus diminish the effectiveness of the desiccant. This deficiency can be attributed to a number of causes, such as improper concentrations of binder and desiccant, insufficient molding pressures, improper drying conditions, or a totally unsuitable desiccant or binder or both. Other desiccants, while they are excellent dehydrating agents in themselves, cannot be molded without diminishing their drying effectiveness. This is so because the binder will seal the ultramicroscopic pores which make up the physical structure of the desiccant and thus decrease the adsorptive capacity.

Satisfactory molded desiccants are known in the art. Activated alumina bonded with aluminum phosphate has been used effectively in drying refrigerants. U. S. Patent No. 2,388,390 discloses a desiccant prepared by coating a desiccant material, preferably calcium sulphate, with cellulose acetate dissolved in a solvent. While cellulose acetate is known to be an excellent binding agent, it has the disadvantage of charring when the desiccant is heated to activating temperatures. It is presumed that this is due to the fact that in binding desiccant particles having an extremely porous structure, such as silica gel, the cellulose acetate solution tends to fill up the microscopic pores which make up the particles. In order to remove the solvent from the pores of the molded desiccant it must be heated at higher than normal activating temperatures if it is to perform effectively as a dehydrating agent. When so treated, the high temperature chars the cellulose acetate which coats the surface of the desiccant thus weakening the surface bond. Methods for binding silica gel with cellulose acetate and molding the same into an effective dehydrating agent and without causing the molded desiccant to char when subjected to activating temperatures have not heretofore been known.

In accordance with the present invention, a method has now been developed whereby an effective molded dehydrating agent can be prepared by binding silica gel with cellulose acetate which overcomes the prior art difficulties without diminishing the adsorptive capacities of the gel. The method comprises wetting a partially water-saturated silica gel with a solution of cellulose acetate dissolved in a solvent to form a moldable mass and compressing the mass into the desired shape. The shaped mass is slowly dried under specific conditions and finally resaturated with water and activated. The desiccant produced by this method has high physical stability and adsorptive capacity, and is not subject to dusting or decrepitation, nor does the activating step char the cellulose acetate.

As used herein, the term "briquette" is not limited to block-like bricks, but it is intended to cover all molded desiccants irrespective of the shape.

The silica gel of the present invention is prepared according to well known procedures. It is made by mixing predetermined concentrations of an acid, such as sulphuric, and a soluble silicate, such as sodium silicate, and allowing the mixture to set to a hydrogel. After setting, the hydrogel is broken into small lumps and thoroughly washed to remove excess acid and the salts resulting from the reaction. The washed hydrogel is then dried, crushed and screened to the desired particle size.

In the present process, the gel size is one of the factors which determines the briquette strength and porosity. A briquette prepared by binding gel having particles larger than 8–40 mesh possesses greater strength and improved porosity than one prepared from smaller particles. A smaller mesh gel not only gives a weaker briquette but if the concentration of the binder is increased to strengthen the briquette, the pressure drop through the briquette becomes undesirably high. The greater the content of binder, the greater is the probability of decreasing adsorptivity by sealing the gel pores. A gel having a size of 8–20 mesh is preferred in the present process. A briquette prepared from gel in this range is not subject to decrepitation when in use and is superior in water adsorptive capacity to those prepared from a smaller sized gel.

The screened, dried gel is then partially saturated in water. The use of partially saturated gel results in a decrease of solvent consumption by about 50% and a reduction in decrepitation of the gel due to heat of wetting by the solvent. It was further discovered that the solvent could be removed from the briquette more easily during activation than if the briquette were prepared from unsaturated gel. This may be so because saturation allows the water to occupy a portion of the pore and thus prevent the solvent from completely penetrating it. Saturation of the gel to a relative humidity at about 40% represents the optimum range, whereas higher saturation (above 40% R. H.) results in progressively weaker briquettes. The strength of the briquette prepared from gel saturated at 40% R. H. is equal to the strength of a briquette made from dry, unsaturated gel.

To the saturated gel is then mixed a suitable quantity of cellulose acetate solution to form a moldable mass which can be worked or otherwise formed into the desired shape, such as in the shape of a block, cylinder, or other suitable form. The cellulose acetate is dissolved in a solvent, such as acetone. The quantity of acetone in which the predetermined amount of cellulose acetate is dissolved is sufficient to permit a small amount of the solution to be exuded or squeezed out during the subsequent compression step. This will result in a thin film of cellulose acetate being deposited on the surface of the briquette when dried and will greatly reduce the surface dusting. The quantity of cellulose acetate in the solution is sufficient to produce a briquette containing a final concentration of about 1.5 to 5.0% cellulose acetate. This concentration permits the formation of a strong briquette having superior water adsorptive and filtration characteristics.

The moldable mass of material is then subjected to pressure to form the desired physical shape. Crushing strength, porosity and dusting characteristics of the molded desiccant are functions of the molding pressure and concentration of the binder. Pressures of the order of about 1000–1200 lbs./sq. in. are advantageously employed in the present process. This will produce a briquette having a crushing strength of about 400 lbs./sq. in. and which has been found to be particularly suitable for drying refrigerants.

It has been discovered that rapid drying of the mold causes fractures in the briquette and this eventually results in division of the briquette along these weakness planes. In the present process, this objection is overcome by first subjecting the mold to air-drying for about one hour. This permits partial evaporation of the acetone and avoids the subsequent swelling of the briquette during heating. Swelling would cause the individual particles to be drawn away from the adherent mass thus weakening the bond there-between and manifestly creating a plane of incipient fracture. In use, the briquette would ultimately crack along these lines.

The air-dried mold is then heated at an intermediate temperature, of the order of about 200° F., for about one hour to remove most of the acetone and some water. Following this step, treatment is continued at an elevated temperature but below the temperature at which charring of the cellulose acetate takes place. This is of the order of about 300 F. and heating at this temperature is continued for about three hours. Where a vacuum is applied this period may be shortened. Heating at this range and for the period of time stipulated removes substantially all of the remaining volatile components. However, this heat treatment is insufficient to bring the briquette into an activated state since small amounts of acetone are still held in the pores of the gel which, if allowed to remain, would reduce the adsorptive capacity of the briquette. A higher temperature would be necessary to remove the residual solvent at this stage but temperatures above 300° F. cause charring of the cellulose acetate.

In the present invention, the difficulty of removing the residual volatile organic matter from the briquette without charring the cellulose acetate is overcome by first saturating the briquette with water and then reheating it. Saturation at a relative humidity of about 80% to 100% will result in removal of the last traces of acetone.

The saturated briquette is activated by heating at a temperature of about 300° F. for a period of time sufficient to reduce the total volatile matter to the desired level. This is usually about 8.0% to 13.0% depending upon the concentration of cellulose acetate. Generally, heating at this temperature for about two to three hours was found to be sufficient to complete activation.

The resulting briquette prepared by binding silica gel with cellulose acetate and in the manner described is comparable to other commercially-available molded desiccants in porosity, crushing strength and dusting characteristics and is superior in water adsorptive capacity and filtration characteristics. Charring of the cellulose acetate during activation of the briquette has been overcome without in any way sacrificing briquette strength, adsorptivity, porosity or dusting characteristics.

The following example is presented to further illustrate one method of preparing the briquette according to the present invention.

EXAMPLE

A cylindrical-shaped briquette 1½ inches in diameter and 1¼ inches in length was prepared by saturating silica gel with water at a relative humidity of about 40%. The gel had a total volatile (TV) content of about 6.25% and was screened to 8–12 mesh prior to saturation. 50 gms. of the saturated gel were mixed with 20 ml. of an 8.35% solution of cellulose acetate dissolved in acetone and mixing was continued until the ingredients were uniformly blended. The mix was more or less an adherent mass which could be molded into any desired shape. It was then transferred to a molding cylinder fitted with a base plate. The piston was inserted and the unit placed in a hydraulic press for molding at a pressure of about 1140 lbs./sq. in. After a short period, the pressure was released and the mold was kept in the cylinder and air-dried for about one hour. It was then dried for an additional hour at a temperature of about 200° F., following which the temperature was increased to 300° F. and drying at this elevated temperature was continued for about three hours. The mold was removed from the cylinder and saturated with water at a relative humidity of 80% and then activated at a temperature of 300° F. for three hours. The final briquette contained 3.5% cellulose acetate.

The thus-described briquette had a crushing strength of approximately 400 lbs./sq. in. and possessed water adsorptive capacity of the same order as the base silica gel, and had an essentially non-dusting type surface. Filtration experiments have indicated that the silica gel briquette as prepared by the present process removes particles as small as 6 microns in diameter.

The following table shows a comparison of water adsorptive capacities of the briquette prepared from a gel water-saturated at an R. H. of 40% and the same type of gel which was dried but not saturated.

Table

| Relative Humidity | Percent Adsorption | |
|---|---|---|
| | Briquette | Unsaturated gel |
| 10 percent | 7.76 | 7.36 |
| 20 percent | 13.25 | 12.79 |
| 40 percent | 23.58 | 24.00 |

As can be seen from the above table, there does not appear to be any difference in the rate of water pick-up between the briquette and the base gel.

While the invention has been described with particular reference to the use of cellulose acetate as the binding and coating agent, it is to be understood that it is not limited thereto but can be successfully practiced by substituting other moisture permeable film-forming materials.

We claim:

1. A method of forming a dehydrating briquette which comprises wetting a mass of partially water-saturated silica gel particles with a solution of a moisture permeable film-former dissolved in a water-soluble solvent in an amount sufficient to coat the surfaces of said gel particles, forming said coated particles into a briquette, slowly drying said briquette to remove the bulk of the solvent therefrom, and finally resaturating the briquette with water and activating the gel briquette.

2. A method according to claim 1 wherein the moisture permeable film-former is cellulose acetate.

3. A method of forming a dehydrating briquette which comprises wetting a mass of partially water-saturated silica gel particles with a solution of cellulose acetate dissolved in a water-soluble solvent in an amount sufficient to coat the surfaces of said gel particles, forming said coated particles into a briquette, evaporating an initial portion of the solvent without appreciable heating, evaporating a further portion of said solvent at an intermediate temperature, drying at an elevated temperature but below that at which charring of the cellulose acetate occurs, and finally resaturating the briquette with water and activating the gel briquette.

4. A method of preparing a dehydrating briquette which comprises mixing together a partially water-saturated silica gel and a solution of cellulose acetate dissolved in a water-soluble solvent to form a moldable mass, forming said mass into a briquette, air-drying said briquette for about one hour, further drying the briquette at a temperature of about 200° F. for about one hour, further heating said briquette at a temperature of about 300° F. for about 3 hours, resaturating the briquette with water, and activating the resaturated briquette.

5. A method of preparing a dehydrating briquette which comprises mixing together silica gel water-saturated at an R. H. of 40% and cellulose acetate dissolved in acetone to form a moldable mass, forming said mass into a briquette, air-drying the briquette for about one hour thereby evaporating a portion of said acetone, further drying the briquette at a temperature of about 200° F. for about one hour, heating the briquette at a temperature of about 300° F. for about three hours, resaturating the briquette with water, and activating the resaturated briquette.

6. A method of preparing a dehydrating briquette which comprises mixing together silica gel having a particle size no smaller than 8–40 mesh and water-saturated at an R. H. of 40% with cellulose acetate dissolved in acetone to form a moldable mass, compressing said mass into a briquette, air-drying the briquette for about one hour to partially evaporate said acetone, further drying the briquette at a temperature of about 200° F. for about one hour to evaporate additional acetone and water, heating said briquette at a temperature of about 300° F. for about 3 hours to remove substantially all of the remaining volatile components, resaturating the briquette with water and activating resaturated briquette.

7. A method of preparing a non-dusting dehydrating briquette which comprises mixing silica gel having a particle size of 8–20 mesh and water-saturated at an R. H. of 40% with an amount of cellulose acetate dissolved in acetone sufficient to introduce 1.5% to 5.0% of cellulose acetate in the final briquette and form a moldable mass, compressing said mass at a pressure of about 1200 lbs. per sq. in. into a briquette, air-drying the briquette for about one hour, further drying at a temperature of about 200° F. for one hour, heating at a temperature of about 300° F. for about 3 hours, and resaturating the briquette with water and finally activating said briquette.

8. A method of preparing a non-dusting dehydrating briquette which comprises mixing silica gel having a particle size of 8–20 mesh and water saturated at an R. H. of 40% with a solution of cellulose acetate dissolved in acetone to form a moldable mass, the amount of acetone being sufficient to provide a thin film of cellulose acetate on the surface of the briquette, compressing said mass into a briquette, air-drying said briquette for about one hour, further drying the briquette at a temperature of about 200° F. for one hour, heating the dried briquette at a temperature of about 300° F. for about 3 hours, and resaturating the briquette with water at an R. H. of at least 80% and activating the said saturated briquette.

9. A method of preparing a non-dusting dehydrating briquette which comprises mixing silica gel having a particle size of 8–20 mesh and water-saturated at an R. H. of 40% with a solution of cellulose acetate dissolved in acetone to form a moldable mass, compressing the mass into a briquette, air-drying the briquette for about one hour to partially evaporate the acetone, further drying said briquette at a temperature of about 200° F. for one hour to remove additional acetone and water, heating the dried briquette at a temperature of about 300° F., for about 3 hours, resaturating the briquette with water at an R. H. of about 80% to 100%, and heating the saturated briquette at a temperature of 300° F. for a time sufficient to activate said briquette and to remove the final traces of acetone therefrom.

References Cited in the file of this patent

UNITED STATES PATENTS

| | | |
|---|---|---|
| 2,052,470 | Hucks | Aug. 25, 1936 |
| 2,064,113 | Heuser | Dec. 15, 1936 |
| 2,138,184 | Martin | Nov. 28, 1938 |
| 2,388,390 | Cook et al. | Nov. 6, 1945 |
| 2,407,962 | Nason | Sept. 17, 1946 |
| 2,417,344 | Barrett | Mar. 11, 1947 |
| 2,429,319 | Kearby | Oct. 21, 1947 |